United States Patent
Feng

(10) Patent No.: US 10,305,691 B2
(45) Date of Patent: May 28, 2019

(54) TRANSLATION SYSTEM AND METHOD

(71) Applicant: Zhong Feng, Jiangsu (CN)

(72) Inventor: Zhong Feng, Jiangsu (CN)

(*) Notice: Subject to any disclaimer, the term of this patent is extended or adjusted under 35 U.S.C. 154(b) by 390 days.

(21) Appl. No.: 15/159,844

(22) Filed: May 20, 2016

(65) Prior Publication Data
US 2017/0222808 A1  Aug. 3, 2017

(30) Foreign Application Priority Data

Feb. 3, 2016 (CN) .......................... 2016 1 0079024

(51) Int. Cl.
| | |
|---|---|
| *H04L 9/32* | (2006.01) |
| *G06F 17/28* | (2006.01) |
| *H04L 29/06* | (2006.01) |
| *H04L 29/08* | (2006.01) |

(52) U.S. Cl.
CPC .......... *H04L 9/3226* (2013.01); *G06F 17/289* (2013.01); *H04L 63/0428* (2013.01); *H04L 63/083* (2013.01); *H04L 67/10* (2013.01); *H04L 67/42* (2013.01)

(58) Field of Classification Search
CPC . H04L 9/3226; H04L 63/0428; H04L 63/083; H04L 67/10; H04L 67/42; G06F 17/289
See application file for complete search history.

(56) References Cited

U.S. PATENT DOCUMENTS

| | | | | |
|---|---|---|---|---|
| 8,380,487 | B2* | 2/2013 | Bastide | G06F 17/289 |
| | | | | 382/182 |
| 8,660,244 | B2* | 2/2014 | Blagsvedt | G06F 17/289 |
| | | | | 379/88.25 |
| 8,856,869 | B1* | 10/2014 | Brinskelle | H04L 63/08 |
| | | | | 726/12 |
| 9,087,045 | B2* | 7/2015 | Prakash | G06Q 10/10 |
| 2003/0176995 | A1* | 9/2003 | Sukehiro | G06F 17/289 |
| | | | | 704/2 |
| 2004/0068411 | A1* | 4/2004 | Scanlan | G06F 17/2827 |
| | | | | 704/277 |
| 2007/0294076 | A1* | 12/2007 | Shore | G06F 17/2836 |
| | | | | 704/2 |

(Continued)

FOREIGN PATENT DOCUMENTS

CN          103514156 A   *   1/2014   ......... H04L 9/32266

*Primary Examiner* — Ali S Abyaneh
*Assistant Examiner* — Shu C Gao

(57) ABSTRACT

The invention discloses a translation system and a method, and belongs to the translation field. Said system consists of the following steps that: a user client sends a translation request to a server; the server determines candidate translator clients corresponding to the translation request after receiving the translation request; the server sends a translation order corresponding to the translation request to the candidate translator clients; the translator clients selectively send scramble commands to the server after receiving the translation order; the server determines a target translator client among the translator clients who have sent the scramble commands after receiving the scramble commands, and sends the translation request to the target translator client. The invention helps reach the effects of being capable of acquiring translation services from translator clients, improving the translation accuracy, and meeting the needs of most people.

18 Claims, 8 Drawing Sheets

(56) References Cited

U.S. PATENT DOCUMENTS

2014/0067723 A1* 3/2014 Katsevman ........ G06Q 30/0283
　　　　　　　　　　　　　　　　　　705/400
2015/0161112 A1* 6/2015 Galvez ................... G06F 9/454
　　　　　　　　　　　　　　　　　　704/7

* cited by examiner

TRANSLATION SYSTEM AND METHOD

CROSS-REFERENCE TO RELATED APPLICATIONS

The present application claims the benefit of Chinese Patent Application No. 201610079024.X filed on Feb. 3, 2016, the contents of which are hereby incorporated by reference.

FIELD OF THE INVENTION

The invention relates to the translation field, in particular to a translation system and method.

DESCRIPTION OF THE RELATED ART

A user will usually use a kind of translation software when getting stuck on text in foreign language. In this case, the user enters unacquainted text in foreign language in the translation software client, then the translation software client searches in the lexicon based on the text in foreign language received from the user, gets translation results and feeds back the translation results to the user; or the translation software client sends the text in foreign language to a server, then the server searches in the lexicon, gets translation results and feeds back the translation results to the translation software client.

In the implementation of the present invention, the inventor finds that there are at least the following problems existing in the prior art:

The text is often translated based on literal meanings mechanically by existing translation methods, and the translation cannot be adjusted based on actual scenarios, and the translation results may not match the actual scenarios, bringing misunderstanding and confusion to the user.

SUMMARY OF THE INVENTION

In order to solve the problems in the prior art, the examples of the invention provide a translation system and a method. The technical schemes are as follows:

On one hand, the invention provides a translation system including at least a user client, a server and at least a translator client;
said user client is used for sending a translation request to said server;
said server is used for converting the translation request into a corresponding translation order and sending the translation order to said translator client after receiving the translation request from said user client;
said translator client is used for selectively sending a scramble command to said server after receiving said translation order;
said server is used for determining a target translator client among said translator clients who have sent scramble commands after receiving said scramble commands, and sending said translation request to said target translator client; and
said translator client is used for translating order contents after a successful scramble, and sending translation results to the server;
said server sends the said translation results to the user client after receiving said translation results from said translator client.

Further, said user client is used for completely or partially encrypting the translation request, and sending an encryption password of the translation request to the server;
said server sends the encrypted translation request and the encryption password from said user client to said translator client;
said translator client receives the encryption password of the translation request, decrypts the translation request with the encryption password, then translates the contents to be translated, and sends the translated contents to the server; and
said server keeps said translation results confidential.

Further, said translator client is used for encrypting said translation results, and sending the encrypted translation results to the server;
said server sends the translation results and the encryption password of the translation results to the user client; and
said user client decrypts the translation results with the encryption password of the translation results.

In an embodiment, the server is used for determining candidate translator clients corresponding to the translation request after receiving the translation request; and
the server is used for matching the translation request with information of the translator client after receiving the translation request; and the information of the translator client includes at least one of language, translation time, user rating, translator level and area of expertise;
the server is used for getting the matching results; and
the server is used for determining candidate translator clients corresponding to the translation request according to the matching results.

In an embodiment, the server is used for determining a target translator client among the translator clients who have sent scramble commands after receiving the scramble commands, and sending the translation request to the target translator client; and
the server is used for determining a target translator client among the translator clients who have sent scramble commands according to the scramble speed after receiving the scramble commands, and sending the translation request to the target translator client;
the server is used for determining a target translator client according to the scramble speed and comprehensive rating of the translator clients who have sent scramble commands after receiving the scramble commands, and sending the translation request to the target translator client.

In an embodiment, before sending the translation request to the server,
said user client acquires contents to be translated according to the text entered by a user, and generates a translation request according to said contents to be translated; or
said user client acquires contents to be translated by speech recognition technology, and generates a translation request according to said contents to be translated; or
said user client acquires contents to be translated in the form of pictures by photography, and generates a translation request according to said contents to be translated; or
said user client acquires contents to be translated by OCR recognition technology, and generates a translation request according to said contents to be translated.

In an embodiment, the translation order includes of one or more of contents to be translated, target language, translation price, time requirement, translator level requirement and simultaneous interpretation requirement.

In an embodiment, the translation system further consists of:
the server used for feeding back information of at least one target translator client to the user client;

the user client used for feeding back information of an awarded translator client to the server after receiving the information of the at least one target translator client; and the server used for sending the translation request to the awarded translator client after receiving the information of the awarded translator client.

In an embodiment, the translation system further includes: the translator client used for sending translation results to the server after receiving the translation request; the server used for forwarding the translation results to the user client; and the user client used for receiving the translation results.

On the other hand, the invention provides a translation method used for the server, the method consists of the following steps with a server:
receiving a translation request from a user client;
determining candidate translator clients corresponding to the translation request;
sending a translation order corresponding to the translation request to the candidate translator clients;
determining a target translator client among the translator clients who have sent the scramble commands after receiving scramble requests selectively sent by the candidate translator clients, and sending the translation request to the target translator client.

In an embodiment, the step of determining candidate translator clients corresponding to the translation request further consists of the following sub-steps of:
matching the translation request with information of the translator client; and the information of the translator client includes of at least one of language, translation time, user rating, translator level and area of expertise;
getting matching results; and
determining candidate translator clients corresponding to the translation request according to the matching results.

In an embodiment, the step of determining a target translator client among the translator clients who have sent the scramble commands after receiving scramble requests selectively sent by the candidate translator clients, and sending the translation request to the target translator client further consists of the following sub-steps of:
determining a target translator client among the translator clients who have sent the scramble commands according to the scramble speed after receiving scramble requests selectively sent by the candidate translator clients, and sending the translation request to the target translator client;
or,
determining a target translator client according to the scramble speed and comprehensive rating of the translator clients who have sent the scramble commands after receiving scramble requests selectively sent by the candidate translator clients, and sending the translation request to the target translator client.

In an embodiment, the translation request is generated by contents to be translated, and the contents to be translated are acquired by the user client according to the text entered by a user; or the contents to be translated are acquired by the user client by speech recognition technology; or the contents to be translated are pictures acquired by the user client by photography; or the contents to be translated are acquired by the user client by OCR recognition technology. In an embodiment, the translation order includes one or more of contents to be translated, target language, translation price, time requirement, translator level requirement and simultaneous interpretation requirement.

In an embodiment, the translation method further consists of:
feeding back information of at least one target translator client to the user client so that the user client feeds back information of an awarded translator client to the server after receiving the information of the at least one target translator client;
sending the translation request to the awarded translator client after receiving the information of the awarded translator client.

In an embodiment, the translation method further consists of:
receiving the translation results from the translator client; and
forwarding the translation results to the user client.

The technical schemes of embodiments of the invention have the following beneficial effects:

A user client sends a translation request to a server; the server determines candidate translator clients corresponding to the translation request after receiving the translation request; the server sends a translation order corresponding to the translation request to the candidate translator clients; the translator clients selectively send scramble commands to the server after receiving the translation order; the server determines a target translator client among the translator clients who have sent the scramble commands after receiving the scramble commands, and sends the translation request to the target translator client. The invention solves the problems that the text is translated based on literal meanings mechanically and inconveniently by existing translation methods, and the translation is adjusted based on actual scenarios, and the translation results fail to match the actual scenarios. In addition, the invention helps reach the effects of being capable of acquiring translation services from translator clients, improving the translation accuracy, and meeting the needs of most people to acquire translation services.

BRIEF DESCRIPTION OF THE DRAWINGS

In order to make clear of technical schemes in examples of the invention, drawings used in the examples will be briefly introduced. Apparently, the drawings described below are only some examples of the invention. A person skilled in the art can obtain other drawings based on these drawings without creative work.

DETAILED DESCRIPTION OF THE PREFERRED EMBODIMENTS

In order to make clear of objectives, technical schemes and advantages of the invention, embodiments of the invention will be further illustrated in detail below in conjunction with drawings.

Figure 1:
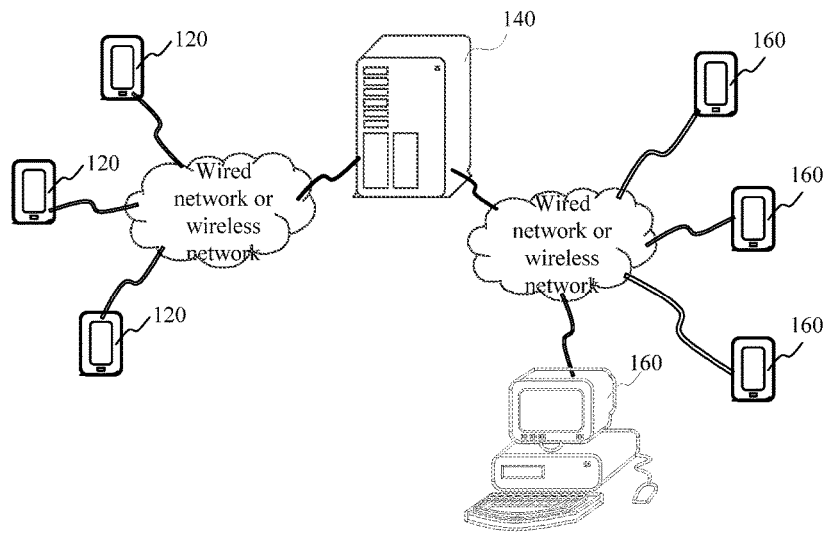
FIG. 1 is a structural representation of an embodiment environment involved in all examples of the invention.

FIG. 1 is a structural representation of an embodiment environment involved in all examples of the invention. The embodiment environment includes at least a user client 120, a server 140 and at least a translator client 160.

The user client 120 is a translation software client running on an electronic device, and used for acquiring translation services. The electronic device can be a mobile phone, a tablet computer, an E-book reader, a portable laptop computer, a desktop computer or a wearable device. The electronic device running with the user client 120 is connected with the server 140 via wired network or wireless network. Multiple user clients 120 can be provided.

The server 140 can be a server, or a server cluster consisting of multiple servers, or a cloud computing service center. The server 140 is at the translation software client.

The translator client 160 is a translation software client running on an electronic device, and used for providing translation services. The electronic device can be a mobile phone, a tablet computer, an E-book reader, a portable laptop computer, a desktop computer or a wearable device. The electronic device running with the translator client 160 is connected with the server 140 via wired network or wireless network. Multiple translator clients 160 can be provided.

Figure 2:
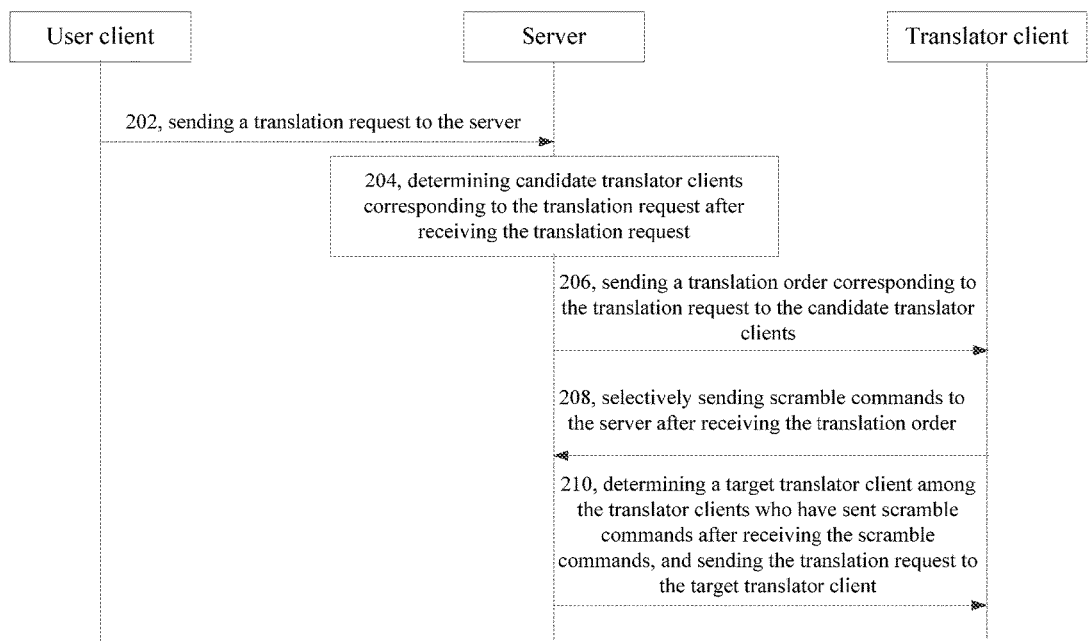
FIG. 2 is a flow chart of a translation method in an example of the invention.

FIG. 2 is a flow chart of a translation method as shown in an example. Taking example of applying the translation method in the embodiment environment as shown in FIG. 1 for illustration, the translation method includes:

step 202, sending a translation request to the server 140 by the user client 120;

step 204, determining candidate translator clients by the server 140 corresponding to the translation request after receiving the translation request;

step 206, sending a translation order corresponding to the translation request to the candidate translator clients by the server 140;

step 208, selectively sending scramble commands to the server 140 by the translator client 160 after receiving the translation order; and step 210, determining a target translator client among the translator clients who have sent scramble commands by the server 140 after receiving the scramble commands, and sending the translation request to the target translator client by the server 140.

To sum up, the translation method in the example includes the following steps that: the user client 120 sends a translation request to the server 140; the server 140 determines candidate translator clients corresponding to the translation request after receiving the translation request; the server 140 sends a translation order corresponding to the translation request to the candidate translator clients; the translator clients 160 selectively send scramble commands to the server 140 after receiving the translation order; the server 140 determines a target translator client among the translator clients 160 who have sent the scramble commands after receiving the scramble commands, and sends the translation request to the target translator client. The invention solves the problems that the text is translated based on literal meanings mechanically and inconveniently by existing translation methods, and the translation cannot be adjusted based on actual scenarios, and the translation results fail to match the actual scenarios. In addition, the invention helps reach the effects of being capable of acquiring translation services from translator clients, improving the translation accuracy, and meeting the needs of most people to obtain translation services.

Figure 3A:
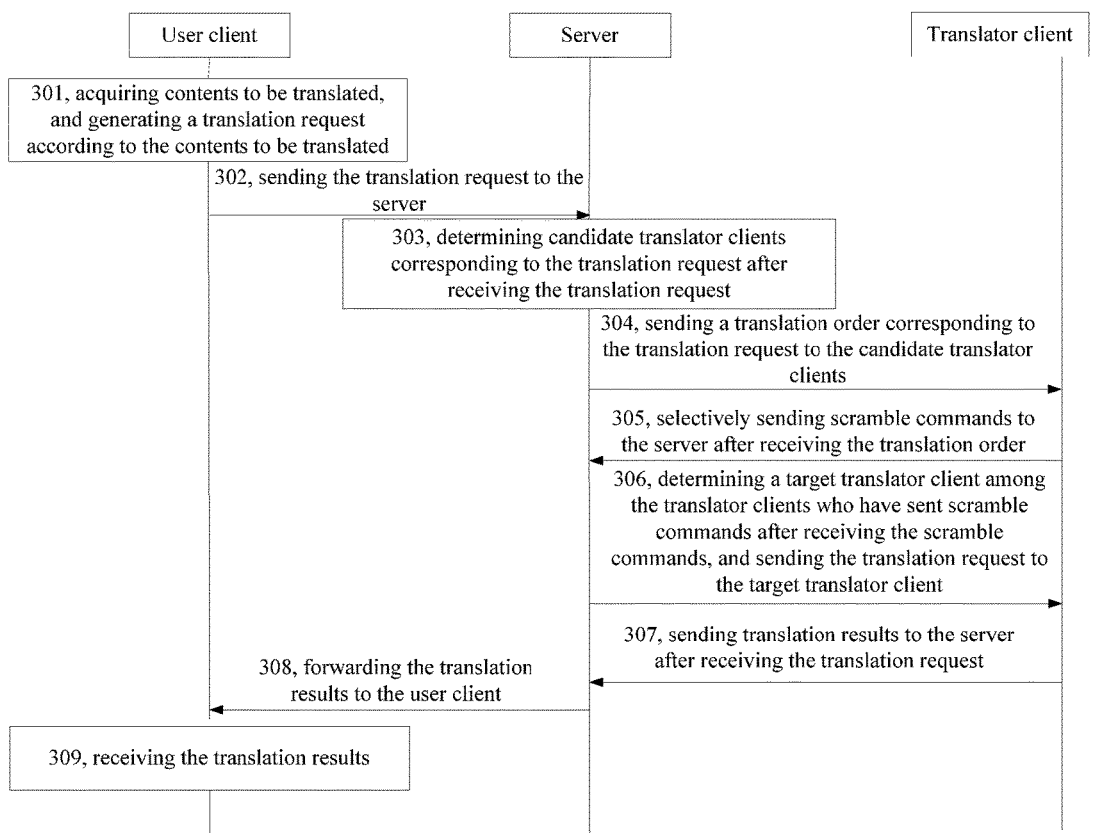
FIG. 3A is a flow chart of a translation method in another example of the invention.

FIG. 3A is a flow chart of a translation method as shown in an example. Taking example of applying the translation method in the embodiment environment as shown in FIG. 1 for illustration, the translation method includes the following steps of:

step 301, acquiring contents to be translated, and generating a translation request according to the contents to be translated by the user client 120;

The user client 120 is a translation software client running on an electronic device, and used for acquiring translation services. The contents to be translated are contents to be translated from the user, such as text, pictures and speech in foreign language.

The user client 120 can acquire contents to be translated in but not limited to the following four ways:

In the first way, the user client 120 acquires contents to be translated according to the text entered by a user, and generates a translation request according to the contents to be translated.

Figure 3B:
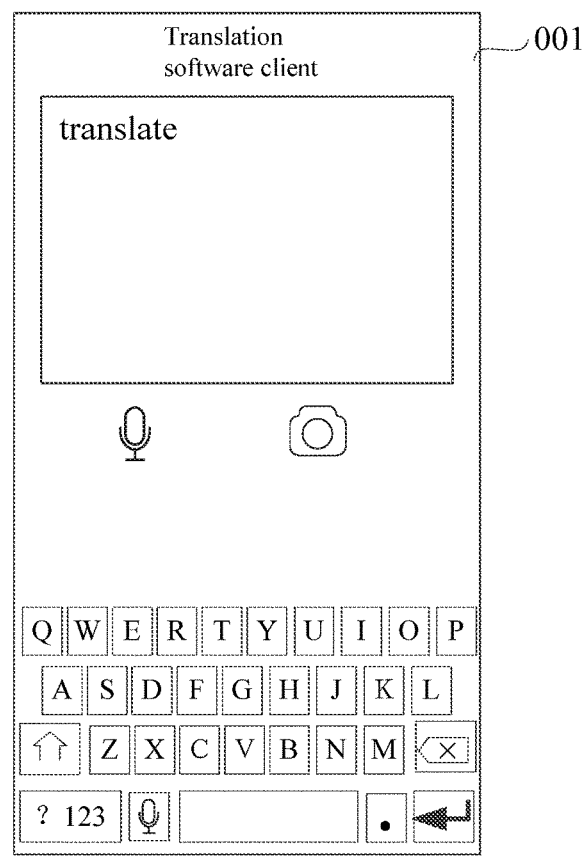
FIG. 3B is a schematic diagram of a translation software client in another example of the invention.

If the user enters text in a user client interface, the user client 120 acquires the contents to be translated according to the text entered by the user. As shown in FIG. 3B, the user enters "translate" in the user client interface (001), and then the user client 120 generates a translation request according to the contents to be translated.

In the second way, the user client 120 acquires contents to be translated by speech recognition technology, and generates a translation request according to the contents to be translated.

If the user enters contents to be translated to the user client by speech, then the user client 120 acquires contents to be translated by speech recognition technology.

Figure 3C:
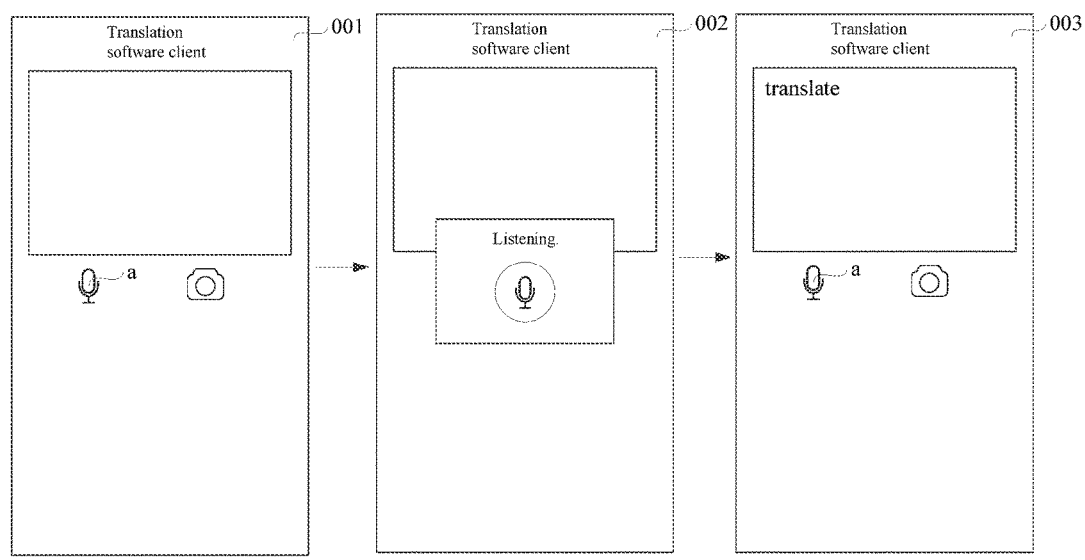
FIG. 3C is a schematic diagram of a translation software client in another example of the invention.

As shown in FIG. 3C, the user clicks the speech icon (a) in the user client interface 001, then the user client calls the speech function of a mobile phone to enter the interface 002, the user says "translate", the mobile phone acquires the frequency, acquires the "translate" said by the user by speech recognition technology, and display the translation results in the interface 003.

In the third way, the user client 120 acquires contents to be translated in the form of pictures by photography, and generates a translation request according to the contents to be translated.

If the contents to be translated are in the form of pictures, the user client 120 can call a camera to acquire the contents to be translated.

Figure 3D:
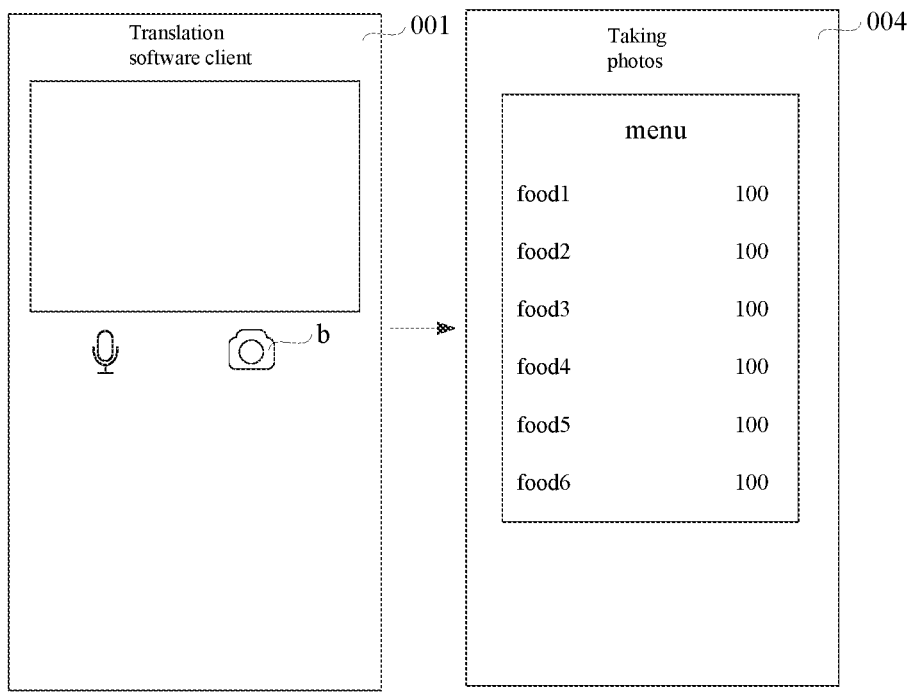
FIG. 3D is a schematic diagram of a translation software client in another example of the invention.

As shown in FIG. 3D, if a user does not know the foreign language on the menu while dining in a foreign restaurant, the user can click the photograph icon (b) in the user client interface 001, and call the mobile phone camera to enter the interface 004 to take photos and acquire information of the menu in foreign language.

In the fourth way, the user client 120 acquires contents to be translated by OCR recognition technology, and generates a translation request according to the contents to be translated.

The OCR recognition technology refers to the technology by which the user client 120 scans data to get image files, then analyzes and processes the image files, and gets text and layout information. The user client 120 calls the camera of an electronic device to scan contents to be translated to get image files, then analyzes and processes the image files, and gets the contents to be translated.

If the contents to be translated are confidential information, the user client 120 can encrypt the contents to be translated. The user client 120 can completely or partially encrypt the translation request. The user client 120 can encrypt the entire translation request, or encrypt the contents to be translated of the translation request.

The translation request may carry a confidential command that requires a service platform and the translator client 160 receiving the translation request to encrypt the translation request and/or information related to the translation request.

Step 302, sending a translation request to the server 140 by the user client 120;

If the translation request is an encrypted request, the user client sends an encryption password of the translation request to the server.

Step 303, determining candidate translator clients corresponding to the translation request by the server 140 after receiving the translation request;

The translator client 160 is a translation software client running on an electronic device, and used for providing translation services. The candidate translator clients are translator clients matching the current translation request. For example, when a user needs the service of translating Japanese into Chinese, six translator clients are available, but only three translator clients can provide the service of translating Japanese into Chinese, the three translator clients are candidate translator clients.

If the translation request carries a confidential command, the server has to keep the translation request confidential.

Figure 3E:
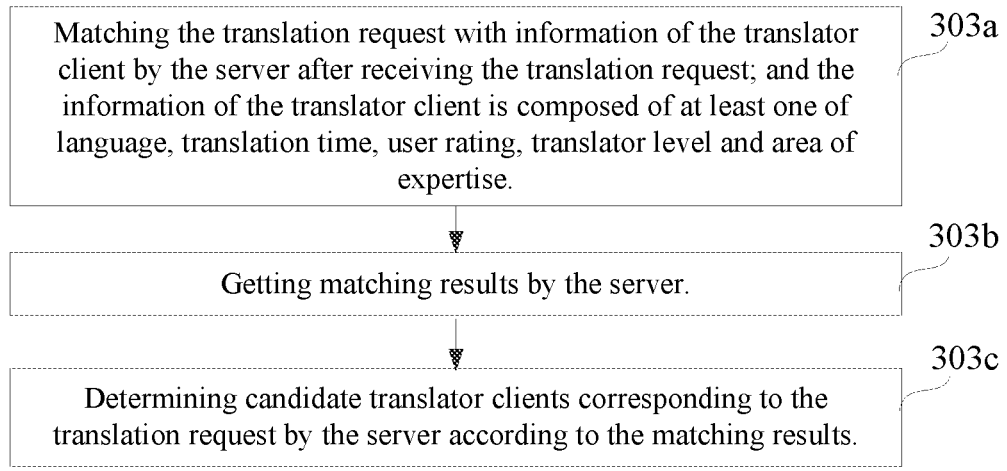
FIG. 3E is a flow chart of a translation method in another example of the invention.

As shown in FIG. 3E, the step that the server determines candidate translator clients corresponding to the translation request after receiving the translation request in step 303 can further includes the following sub-steps of:

step 303a, matching the translation request with information of the translator client by the server 140 after receiving the translation request; wherein information of the translator client consists of at least one of language, translation time, user rating, translator level and area of expertise.

The information of the translator client 160 refers to relevant data of translators corresponding to the translator client, such as language, translation time, user rating, translator level and area of expertise. The server matches the translation request with one or more of the information of the translator client.

For example, if the language required in the translation request is Japanese, the server 140 matches the language "Japanese" with the language of the translator client 160; if the area of expertise required in the translation request is the field of intellectual property, the server 140 matches the "the field of intellectual property" with the area of expertise of the translator client 160; if the translation request requires that the language is Japanese and the translator level is five star, the server 140 matches the language "Japanese" and the translator level "five star" with the language and translator level of the translator client 160.

Step 303b, getting the matching results by the server 140.

Step 303c, determining candidate translator clients corresponding to the translation request by the server 140 according to the matching results.

Figure 3F:
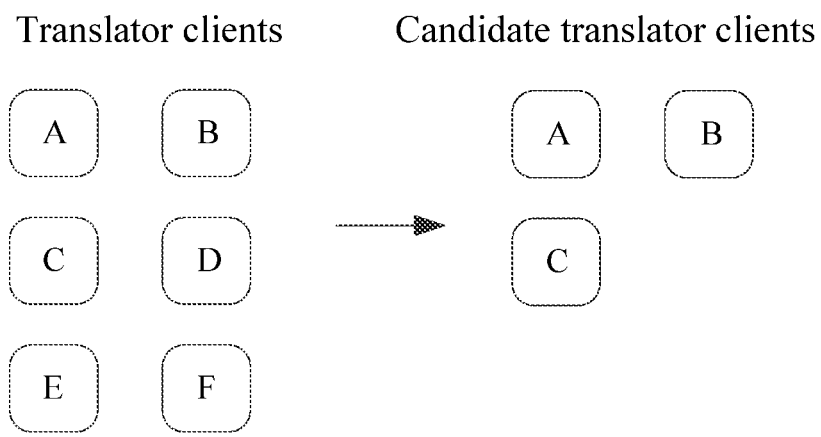
FIG. 3F is a schematic diagram of determining candidate translator clients in another example of the invention.

The server 140 determines eligible translator clients as candidate translator clients. As shown in FIG. 3F, after matching the language "Japanese" with the language of the translator client, the server determines candidate translator clients A, B and C corresponding to the language "Japanese" among the translator clients A, B, C, D, E and F.

If the translation request is encrypted, the server 140 matches information other than the encrypted part of the partially encrypted translation request with information of translator clients, gets matching results, and determines candidate translator clients. The server 140 determines translator clients currently in idle state as candidate translator clients when the translation request is completely encrypted.

Step 304, sending a translation order corresponding to the translation request to the candidate translator clients by the server 140.

The translation order includes one or more of contents to be translated, target language, translation price, time requirement, translator level requirement and simultaneous interpretation requirement.

Step 305, selectively sending scramble commands to the server 140 by the translator client 160 after receiving the translation order.

The scramble commands are commands for receiving the translation order that are fed back by the translator clients to the server. The selectively sending scramble commands to the server refers that one or more candidate translator clients scramble the translation order, in some cases, not all candidate translator clients scramble the translation order.

Figure 3G:
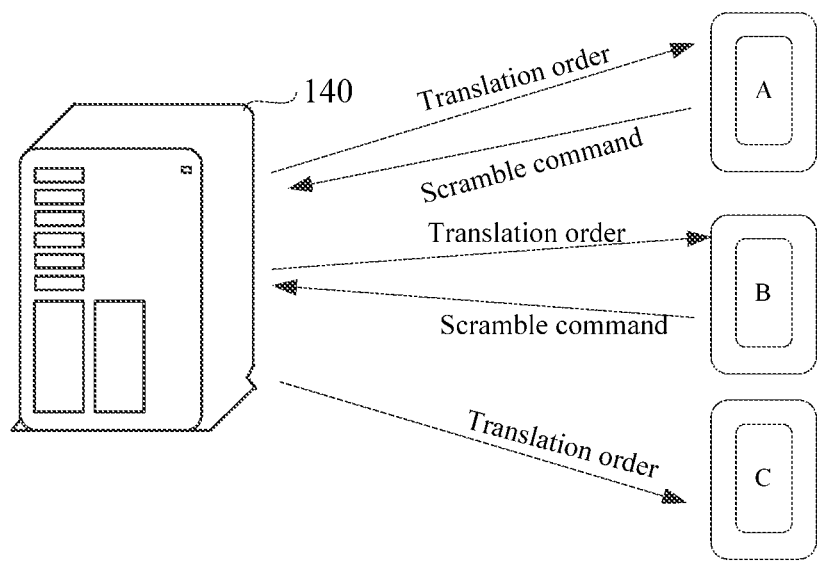
FIG. 3G is a schematic diagram of sending scramble commends in another example of the invention.

As shown in FIG. 3G, the server 140 sends a translation order to candidate translator clients A, B and C, after the candidate translator clients A, B and C receive the translation order, the candidate translator clients A and B send scramble commands to the server 140, but the candidate translator client C does not send a scramble command.

Step 306, determining a target translator client among the translator clients who have sent scramble commands by the server 140 after receiving the scramble commands, and sending the translation request to the target translator client by the server 140.

The target translator client is a client determined by the server to provide translation services to the user client. That is, the server 140 selects a translator client among the translator clients who have sent scramble commands as the target translator client.

If the translation request is encrypted, the server 140 sends the encryption password of the translation request to the target translator client.

In the step, the target translator client can be determined in the following ways:

In the first way, the server determines a target translator client among the translator clients who have sent scramble commands according to the scramble speed after receiving the scramble commands, and sends the translation request to the target translator client.

The scramble speed is the speed at which the candidate translator clients send the scramble commands to the server.

For example, the server determines the translator client A having fast scramble speed as the target translator client.

In the second way, the server determines a target translator client according to the scramble speed and comprehensive rating of the translator clients who have sent scramble commands after receiving the scramble commands, and sends the translation request to the target translator client.

The scramble speed is the speed at which the candidate translator clients send the scramble commands to the server. The comprehensive rating of the translator client is the comprehensive rating obtained based on the user rating, translation speed and translation accuracy.

For example, if the scramble speed of the translator client A is 1s, and the comprehensive rating of the translator client A is 80, while the scramble speed of the translator client B is 2s, and the comprehensive rating of the translator client B is 95, the server works out that the score of the translator client B is higher than that of the translator client A according to a weighted average algorithm, determines the translator client B as the target translator client, and sends a translation request to the translator client B.

Step 307, the translator client 160 sends translation results to the server after receiving the translation request.

After receiving the translation request, the target translator client analyzes contents to be translated in the translation request, gets translation results entered by a translator corresponding to the target translator client, and sends the translation results to the server.

If the translation request is encrypted, after receiving the encryption password of the translation request, the target translator client decrypts the translation request with the password, analyzes contents to be translated in the translation request, and gets translation results entered by the translator corresponding to the target translator client. The target translator client can also encrypt the translation results, and send the encrypted translation results to the server. The encryption password of the translation results can be the same as or different from the encryption password of the translation request.

If the translation request carries a confidential command, the translator client and the translator corresponding to the translator client have to keep the translation request and the translation results confidential.

Step 308, forwarding the translation results to the user client 120 by the server 140.

If the translation results are encrypted, the server sends the encryption password of the translation results to the user client while forwarding the translation results to the user client. If the user client appoints an encryption password in the translation request, the server needs not to send the encryption password of the translation results to the user client when the target translator client uses the appointed encryption password to encrypt the translation results.

If the translation request carries a confidential command, the server has to keep the translation results corresponding to the translation request confidential.

Step 309, receiving the translation results by the user client 120.

Figure 3H:
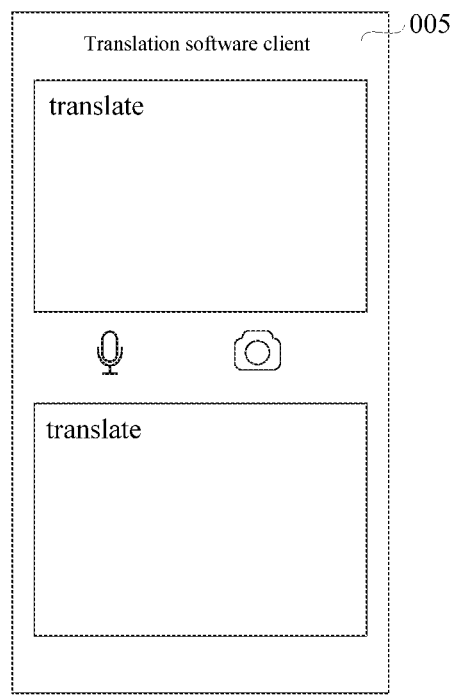
FIG. 3H is a schematic diagram of a translation software client in another example of the invention.

After the user client 120 receives the translation results, the user can see or hear the translation results in the user client interface. As shown in FIG. 3H, the user can see the translation result "translate" in the user client interface 005.

If the translation results are encrypted, the user client decrypts the translation results with the encryption password of the translation results.

To sum up, the translation method in the example includes the following steps of: a user client 120 sends a translation request to a server 140; the server 140 determines candidate translator clients corresponding to the translation request after receiving the translation request; the server 140 sends a translation order corresponding to the translation request to the candidate translator clients; the translator clients 160 selectively send scramble commands to the server 140 after receiving the translation order; the server 140 determines a target translator client among the translator clients who have sent the scramble commands after receiving the scramble commands, and sends the translation request to the target translator client. The invention solves the problems that the text is translated based on literal meanings mechanically and inconveniently by existing translation methods, and the translation cannot be adjusted based on actual scenarios, and the translation results fail to match the actual scenarios. In addition, the invention helps reach the effects of being capable of acquiring translation services from translator clients, improving the translation accuracy, and meeting the needs of most people to obtain translation services.

In addition, the server 140 matches the translation request with information of the translator client 160, gets matching results, and determines candidate translator clients corresponding to the translation request according to the matching results, thus achieving the effects of being capable of determining candidate translator clients according to contents to be translated, saving resources, and improving the translation service efficiency and professional directionality.

Another example of method of the invention is described below. Please refer to the example of method corresponding to FIG. 3A for details not described.

Figure 4:
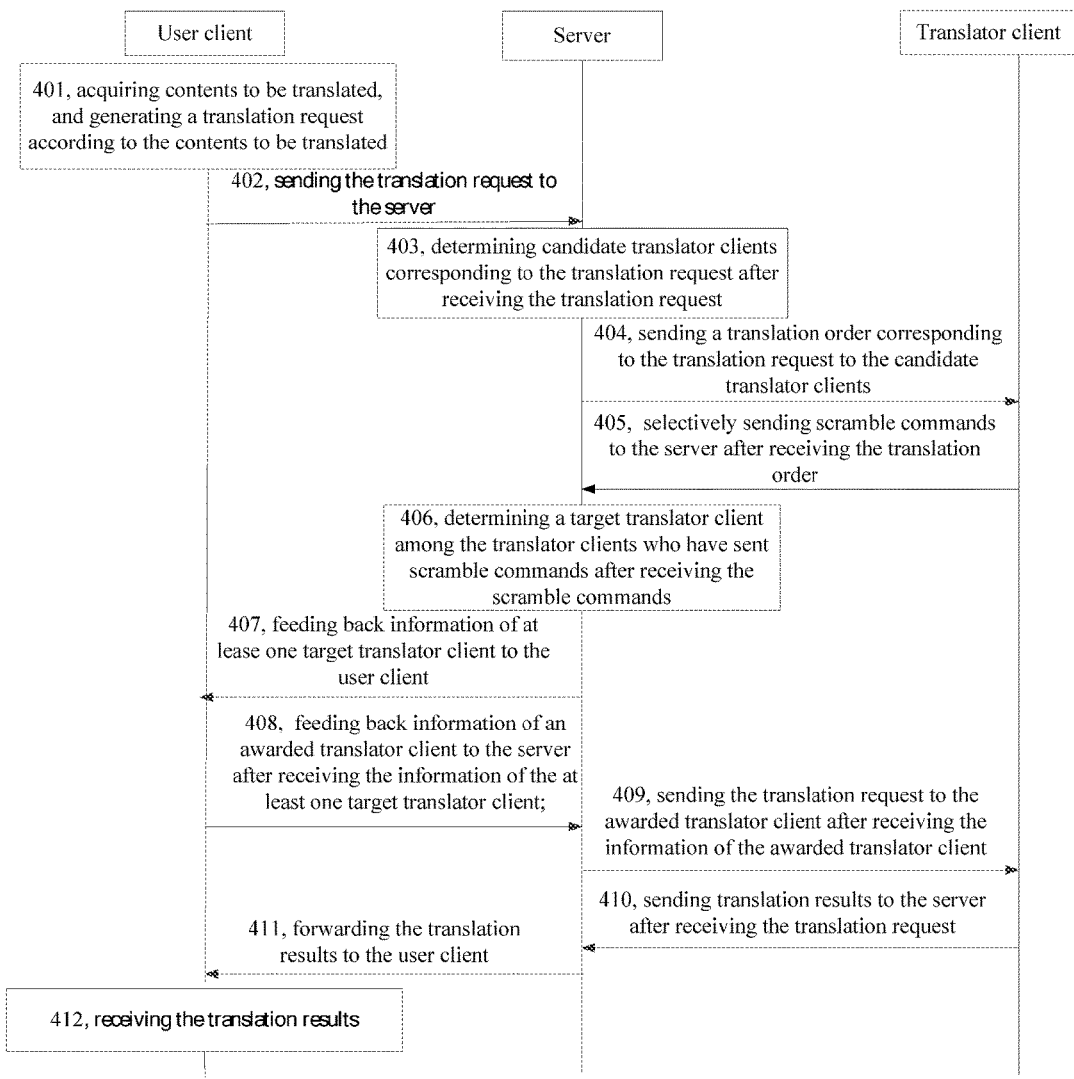
FIG. 4 is a flow chart of a translation method in another example of the invention.

FIG. 4 is a flow chart of a translation method as shown in an example. Taking example of applying the translation method in the embodiment environment as shown in FIG. 1 for illustration, the translation method consists of the following steps of:

Step 401, acquiring contents to be translated by a user client 120, and generating a translation request by a user client 120 according to the contents to be translated.

The user client 120 is a translation software client running on an electronic device, and used for acquiring translation services. The contents to be translated are contents to be translated from the user, such as text, pictures and voice in foreign language.

Step 402, sending a translation request to the server 140 by the user client 120.

Step 403, determining candidate translator clients corresponding to the translation request by the server 140 after receiving the translation request.

The translator client 160 is a translation software client running on an electronic device, and used for providing translation services. The candidate translator clients are translator clients 160 matching the current translation request. For example, when a user needs the service of translating Japanese into Chinese, 6 translator clients are available, but only 3 translator clients can provide the service of translating Japanese into Chinese, the 3 translator clients are candidate translator clients.

Step 404, sending a translation order corresponding to the translation request to the candidate translator clients by the server 140.

The translation order includes one or more of contents to be translated, target language, translation price, time requirement, translator level requirement and simultaneous interpretation requirement.

Step 405, selectively sending scramble commands to the server 140 by the translator client 160 after receiving the translation order; and The scramble commends are commands for receiving the translation order that are fed back by the translator clients to the server. The selectively sending scramble commands to the server refers that one or more candidate translator clients scramble the translation order, in some cases, not all candidate translator clients scramble the translation order.

Step 406, determining a target translator client among the translator clients who have sent the scramble commands by the server 140 after receiving the scramble commands.

The target translator client is a client determined by the server 140 to provide translation services to the user client.

After determining the target translator client, the server 140 sends a translation request to the target translator client when there is only one target translator client; when the number of target translator clients is larger than one, the server can feed information of the target translator clients back to the user to allow the user to determine the translator client providing services thereto. The steps are as follows:

Step 407, feeding back information of at least one target translator client to the user client 120 by the server 140.

The information of the target translator client includes but not limited to head portrait, nickname, language, translation time, user rating, translator level, area of expertise and geographical location of the target translator client.

For example, the server determines the translator clients A, B and C as the target translator clients, as the number of the target translator clients is larger than one, the server 140 feeds information of the translator clients A, B and C back to the user client 120 to prevent repetitive work of translators, improve user experience and give the decision-making power to the user.

Step 408, the user client 120 feeds back information of an awarded translator client to the server after receiving the information of the at least one target translator client.

After the user client 120 receives the information of the target translator client, the user corresponding to the user client 120 decides to select a translator client to provide translation services, and the translator client 160 selected by the user is the awarded translator client. The user client 120 feeds information of the awarded translator client back to the server. For example, if the user selects the translator client C as the awarded translator client, the user client 120 feeds information of the translator client C to the server 140.

Step 409, sending the translation request to the awarded translator client by the server 140 after receiving the information of the awarded translator client.

For example, sending a translation request to the translator client C by the server 140.

Step 410, sending translation results to the server 140 by the translator client 160 after receiving the translation request.

After receiving the translation request, the awarded translator client analyzes contents to be translated in the translation request, gets translation results entered by a translator corresponding to the awarded translator client, and sends the translation results to the server 140.

Step 411, the server 140 forwards the translation results to the user client 120.

Step 412, the user client 120 receives the translation results.

After the user client receives the translation results, the user can see or hear the translation results in the user client interface.

To sum up, the translation method in the example includes the following steps that: a user client 120 sends a translation request to a server 140; the server 140 determines candidate translator clients corresponding to the translation request after receiving the translation request; the server 140 sends a translation order corresponding to the translation request to the candidate translator clients; the translator clients 160 selectively send scramble commands to the server 140 after receiving the translation order; the server 140 determines a target translator client among the translator clients who have sent the scramble commands after receiving the scramble commands, and sends the translation request to the target translator client. The invention solves the problems that the text is translated based on literal meanings mechanically and inconveniently by existing translation methods, and the translation cannot be adjusted based on actual scenarios, and the translation results fail to match the actual scenarios. In addition, the invention helps reach the effects of being capable of acquiring translation services from translator clients, improving the translation accuracy, and meeting the needs of most people to obtain translation services.

In addition, the server 140 matches the translation request with information of the translator client, gets matching results, and determines candidate translator clients corresponding to the translation request according to the matching results, thus achieving the effects of being capable of determining candidate translator clients according to contents to be translated, saving resources, and improving the translation service efficiency and professional directionality.

In addition, the server 140 feeds back information of at least one target translator client to the user client 120. The user client 120 feeds back information of an awarded translator client to the server 140 after receiving the information of the at least one target translator client. The server 140 sends the translation request to the awarded translator client after receiving the information of the awarded translator client, and gives the user the decision-making power to select the awarded translator client, improving user experience.

Figure 5:
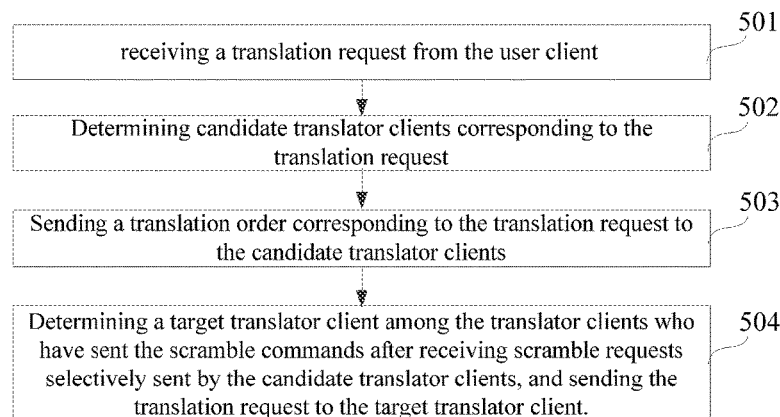
FIG. 5 is a flow chart of a translation method in an example of the invention.

FIG. 5 is a flow chart of a translation method as shown in an example. Taking example of applying the translation method in the server 140 as shown in FIG. 1 for illustration, the method consists of the following steps of:

step 501, receiving a translation request from a user client 120 by the server 140;

step 502, determining candidate translator clients corresponding to the translation request by the server 140;

step 503, sending a translation order corresponding to the translation request to the candidate translator clients by the server 140; and step 504, determining a target translator client among the translator clients who have sent the scramble commands by the server 140 after receiving scramble requests selectively sent by the candidate translator clients by the server 140, and sending the translation request to the target translator client.

To sum up, the translation method in the example includes the following steps that: the server 140 receives a translation request from the user client 120, determines candidate translator clients corresponding to the translation request, sends a translation order corresponding to the translation request to the candidate translator clients, determines a target translator client among the translator clients who have sent the scramble commands after receiving scramble requests selectively sent by the candidate translator clients, and sends the translation request to the target translator client. The invention solves the problems that the text is translated based on literal meanings mechanically and inconveniently by existing translation methods, and the translation cannot be adjusted based on actual scenarios, and the translation results fail to match the actual scenarios. In addition, the invention helps reach the effects of being capable of acquiring translation services from translator clients, improving the translation accuracy, and meeting the needs of most people to obtain translation services.

Another example of method of the invention is described below. Taking example of applying the translation method in the server 140 as shown in FIG. 1 for illustration, the method consists of the following steps that:

receiving a translation request from a user client 120 by the server 140;

determining candidate translator clients corresponding to the translation request by the server 140;

sending a translation order corresponding to the translation request to the candidate translator clients by the server 140; determines a target translator client among the translator clients who have sent the scramble commands by the server 140 after receiving scramble requests selectively sent by the candidate translator clients, and sending the translation request to the target translator client by the server 140.

Optionally, the step that the server 140 determines candidate translator clients corresponding to the translation request further includes the following sub-steps that:
matching the translation request with information of the translator client by the server 140;
and the information of the translator client includes at least one of language, translation time, user rating, translator level and area of expertise;
getting matching results by the server 140; and
determining candidate translator clients corresponding to the translation request by the server 140 according to the matching results.

Optionally, the step that the server 140 determines a target translator client among the translator clients who have sent the scramble commands after receiving scramble requests selectively sent by the candidate translator clients, and sends the translation request to the target translator client further includes the following sub-steps that:
determining a target translator client among the translator clients who have sent the scramble commands by the server 140 according to the scramble speed after receiving scramble requests selectively sent by the candidate translator clients, and sending the translation request to the target translator client by the server 140;
or,
determining a target translator client by the server 140 according to the scramble speed and comprehensive rating of the translator clients who have sent the scramble commands after receiving scramble requests selectively sent by the candidate translator clients, and sending the translation request to the target translator client by the server 140.

Optionally,
the translation request is generated by contents to be translated, and the contents to be translated are acquired by the user client 120 according to the text entered by a user; or the contents to be translated are acquired by the user client by speech recognition technology; or the contents to be translated are pictures acquired by the user client 120 by photography; or the contents to be translated are acquired by the user client 120 by OCR recognition technology.

Optionally, the translation order includes one or more of contents to be translated, target language, translation price, time requirement, translator level requirement and simultaneous interpretation requirement.

Optionally, the translation method further includes the following steps that:
feeding back information of at least one target translator client to the user client 120 by the server 140 so that the user client 120 feeds back information of an awarded translator client to the server 140 after receiving the information of the at least one target translator client;
the server 140 is used for sending the translation request to the awarded translator client after receiving the information of the awarded translator client.

Optionally, the translation method further includes the following steps that:
receiving the translation results from the translator client; by the server 140, and
forwarding the translation results to the user client 120 by the server 140.

To sum up, the translation method in the example includes the following steps that: the server 140 receives a translation request from the user client 120, determines candidate translator clients corresponding to the translation request, sends a translation order corresponding to the translation request to the candidate translator clients, determines a target translator client among the translator clients who have sent the scramble commands after receiving scramble requests selectively sent by the candidate translator clients, and sends the translation request to the target translator client. The invention solves the problems that the text is translated based on literal meanings mechanically and inconveniently by existing translation methods, and the translation cannot be adjusted based on actual scenarios, and the translation results fail to match the actual scenarios. In addition, the invention helps reach the effects of being capable of acquiring translation services from translator clients, improving the translation accuracy, and meeting the needs of most people to obtain translation services.

In addition, the server 140 matches the translation request with information of the translator client, gets matching results, and determines candidate translator clients corresponding to the translation request according to the matching results, thus achieving the effects of being capable of determining candidate translator clients according to contents to be translated, saving resources, and improving the translation service efficiency and professional directionality.

In addition, the server 140 feeds back information of at least one target translator client to the user client 120 so that the user client 120 feeds back information of an awarded translator client to the server 140 after receiving the information of the at least one target translator client, sends the translation request to the awarded translator client after receiving the information of the awarded translator client, and gives the user the decision-making power to select the awarded translator client, improving user experience.

Figure 6:
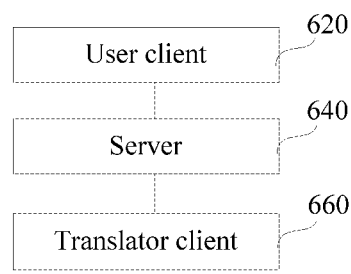
FIG. 6 is a structural block diagram of a translation system in an example of the invention.

FIG. 6 is a structural block diagram of a translation system in another example of the invention. The translation system includes a user client 620, a server 640 and a translator client 660, the user client 620 is connected with the server 640 via wired network or wireless network, and the server 640 is connected with the translator client 660 via wired network or wireless network.

The user client 620 is used for sending a translation request to the server 640;

The server 640 is used for determining candidate translator clients corresponding to the translation request after receiving the translation request;

The server 640 is used for sending a translation order corresponding to the translation request to the candidate translator clients;

The translator client 660 is used for selectively sending scramble commands to the server after receiving the translation order;

The server 640 is used for determining a target translator client among the translator clients who have sent scramble commands after receiving the scramble commands, and sending the translation request to the target translator client.

Further,

The server 640 is used for determining candidate translator clients corresponding to the translation request after receiving the translation request further consists of the following sub-steps that:
the server 640 is used for matching the translation request with information of the translator client after receiving the translation request; and the information of the translator client 660 includes at least one of language, translation time, user rating, translator level and area of expertise;
the server 640 is used for getting the matching results; and the server 640 is used for determining candidate translator clients corresponding to the translation request according to the matching results.

Further,
the server 640 is used for determining a target translator client among the translator clients who have sent scramble commands after receiving the scramble commands, and sending the translation request to the target translator client further consists of the following sub-steps that:
the server 640 is used for determining a target translator client among the translator clients who have sent scramble commands according to the scramble speed after receiving the scramble commands, and sending the translation request to the target translator client;
or,
the server 640 is used for determining a target translator client according to the scramble speed and comprehensive rating of the translator clients who have sent scramble commands after receiving the scramble commands, and sending the translation request to the target translator client.

Further,
before sending a translation request to the server 640 the user client 620, further includes the following sub-steps that:
acquiring contents to be translated by the user client 620 according to the text entered by a user, and generating a translation request the user client 620 according to the contents to be translated; or
acquiring contents to be translated the user client 620 by speech recognition technology, and generating a translation request by the user client 620 according to the contents to be translated; or
acquiring contents to be translated by the user client 620 in the form of pictures by photography, and generating a translation request by the user client 620 according to the contents to be translated; or
acquiring contents to be translated by the user client 620 by OCR recognition technology, and generating a translation request by the user client 620 according to the contents to be translated.

Further,
the translation order includes one or more of contents to be translated, target language, translation price, time requirement, translator level requirement and simultaneous interpretation requirement.

Further, the translation system includes:
the server 640 used for feeding back information of at least one target translator client to the user client 620;
the user client 620 used for feeding back information of an awarded translator client to the server after receiving the information of the at least one target translator client; and
the server 640 used for sending the translation request to the awarded translator client after receiving the information of the awarded translator client.

Further, the translation system includes:
the translator client 660 used for sending translation results to the server after receiving the translation request;
the server 640 used for forwarding the translation results to the user client; and
the user client 620 used for receiving the translation results.

To sum up, the translation system in the example includes: a user client 620 used for sending a translation request to a server 640; the server 640 used for determining candidate translator clients corresponding to the translation request after receiving the translation request; the server 640 used for sending a translation order corresponding to the translation request to the candidate translator clients; a translator client 660 used for selectively sending scramble commands to the server 640 after receiving the translation order; and the server 640 used for determining a target translator client among the translator clients who have sent the scramble commands after receiving the scramble commands, and sending the translation request to the target translator client. The invention solves the problems that the text is translated based on literal meanings mechanically and inconveniently by existing translation methods, and the translation cannot be adjusted based on actual scenarios, and the translation results fail to match the actual scenarios. In addition, the invention helps reach the effects of being capable of acquiring translation services from translator clients, improving the translation accuracy, and meeting the needs of most people to obtain translation services.

In addition, the server 640 matches the translation request with information of the translator client 660, gets matching results, and determines candidate translator clients corresponding to the translation request according to the matching results, thus achieving the effects of being capable of determining candidate translator clients according to contents to be translated, saving resources, and improving the translation service efficiency and professional directionality.

In addition, the server 640 feeds back information of at least one target translator client to the user client. The user client 620 feeds back information of an awarded translator client to the server 640 after receiving the information of the at least one target translator client. The server 640 sends the translation request to the awarded translator client after receiving the information of the awarded translator client, and gives the user the decision-making power to select the awarded translator client, improving user experience.

It should be noted that the examples of the translation method and the translation system in the above embodiments result of the same idea. The specific realization process is shown in the examples of the translation method, and not repeated here.

The above serial numbers of the examples of the invention are only for the purpose of description, and do not represent the merits of the examples.

The data transmission technology described in the invention is not limited to tunnel transmission technology, coordinated multi-point transmission technology, carrier aggregation transmission technology, multi-antenna transmission technology and multiplexing technology (frequency division multiplexing, time division multiplexing and wavelength division multiplexing). The data transmission technology above can be applied to the invention to realize data transmission among the user client, the server and the translator client.

It should be understood by a person skilled in the art that all or part of steps to realize the above examples can be completed by hardware, or by related hardware instructed by a program. The program can be stored in a computer readable storage medium, and the storage medium mentioned above can be a read-only memory, a disk or a CD.

It should be understood that the forgoing is only preferred examples of the invention, and could not limit the invention for this reason, and any modification, equivalent replacement and improvement made within the spirit and rule of the invention are included within the protection scope of the invention.

What is claimed is:

1. A translation system, comprising system comprising: a user client, wherein the user client is a translation software running on a first electronic device, a server comprising a processor and a memory, and at least one translator client wherein the at least one translator client is a translation software running on a second electronic device;

said user client sending a translation request to said server, wherein the translation request is completely or partially encrypted with an encryption password;

said server decrypting the encrypted translation request with the encryption password and converting the translation request into a corresponding translation order and sending the translation order to said at least one translator client;

said at least one translator client selectively sending a scramble command to said server;

said server determining a target translator client and sending said translation request to said target translator client; and said target translator client translating order contents, encrypting translation results, and sending the encrypted translation results to the server;

said server sending said encrypted translation results with the encryption password to said user client;

said user client decrypts the encrypted translation results with the encryption password; and said server keeping said translation results confidential.

2. The translation system according to claim 1, wherein said at least one translator client encrypting said translation results, and sending the encrypted translation results to the server;

said server sends the translation results and the encryption password of the translation results to the user client; and said user client decrypts the translation results with the encryption password of the translation results.

3. The translation system according to claim 1, wherein said server matching said translation request with information of said at least one translator client after receiving said translation request; information of said at least one translator client includes at least one of language, translation time, user rating, translator level and area of expertise;

said server getting the matching results; and said server determining candidate translator client corresponding to said translation request according to said matching results.

4. The translation system according to claim 1, wherein said server determining a target translator client and sending said translation request to said target translator client, and said server determining a target translator client according to scramble speed after receiving said scramble commands, and sending said translation request to said target translator client;

or, said server determining a target translator client according to scramble speed and comprehensive rating of said at least one translator client who have sent scramble commands after receiving said scramble commands, and sending said translation request to said target translator client.

5. The translation system according to claim 1, wherein said user client acquires order contents to be translated according to the text entered by a user, and generates a translation request according to said order contents to be translated; or said user client acquires order contents to be translated by speech recognition technology, and generates a translation request according to said order contents to be translated; or said user client acquires order contents to be translated in the form of pictures by photography, and generates a translation request according to said order contents to be translated; or said user client acquires order contents to be translated by optical character recognition (OCR) technology, and generates a translation request according to said order contents to be translated.

6. The translation system according to claim 1, wherein said user client acquires order contents to be translated according to text entered by a user, and generates a translation request according to said order contents to be translated; or said user client acquires order contents to be translated by speech recognition technology, and generates a translation request according to said order contents to be translated; or said user client acquires order contents to be translated in the form of pictures by photography, and generates a translation request according to said order contents to be translated; or said user client acquires order contents to be translated by OCR recognition technology, and generates a translation request according to said order contents to be translated.

7. The translation system according to claim 3, wherein said user client acquires contents to be translated according to the text entered by a user, and generates a translation request according to said contents to be translated; or said user client acquires contents to be translated by speech recognition technology, and generates a translation request according to said contents to be translated; or said user client acquires contents to be translated in the form of pictures by photography, and generates a translation request according to said contents to be translated; or said user client acquires contents to be translated by OCR recognition technology, and generates a translation request according to said contents to be translated.

8. The translation system according to claim 4, wherein said user client acquires contents to be translated according to the text entered by a user, and generates a translation request according to said contents to be translated; or said user client acquires contents to be translated by speech recognition technology, and generates a translation request according to said contents to be translated; or said user client acquires contents to be translated in the form of pictures by photography, and generates a translation request according to said contents to be translated; or said user client acquires contents to be translated by OCR recognition technology, and generates a translation request according to said contents to be translated.

9. The translation system according to claim 1, wherein said translation order includes one or more of contents to be translated, target language, translation price, time requirement, translator level requirement and simultaneous interpretation requirement.

10. The translation system according to claim 1, wherein said server used for feeding back information of at least one target translator client to said user client;

said user client used for feeding back information of an awarded translator client to said server after receiving the information of said at least one target translator client; and said server used for sending said translation request to said awarded translator client after receiving the information of said awarded translator client.

11. A translation method relates to a user client, wherein the user client is a translation software running on a first electronic device, a server comprising a processor and a memory, and at least one translator client, wherein the at least one translator client is a translation software running on a second electronic device, comprising:

sending, a translation request to said server, wherein the translation request is completely or partially encrypted with an encryption password;

decrypting, by said server, the encrypted translation request with the encryption password and converting, by said server, the translation request into a corresponding translation order and sending, by said server, the translation order to said at least one translator client;

selectively sending, by said at least one translator client, a scramble command to said server;

determining, by said server, a target translator client and sending, by said server, said translation request to said target translator client;

translating, by said target translator client, order contents, encrypting, by said target translator client, translation results, and sending, by said target translator client, the encrypted translation results to the server;

sending, by said server, said encrypted translation results with the encryption password to said user client;

decrypting, by said user client, the encrypted translation results with the encryption password; and keeping said translation results confidential by said server.

12. The translation method according to claim 11, wherein said step of determining a target translator clients further includes the following sub-steps of: matching said translation request with information of said at least one translator client; and the information of said at least one translator client includes at least one of language, translation time, user rating, translator level and area of expertise; getting matching results; and determining candidate translator clients corresponding to said translation request according to said matching results.

13. The translation method according to claim 11, wherein said step of determining a target translator clients further includes the following sub-steps of: determining at least one translator clients currently in idle state as candidate translator clients when said translation request is completely encrypted; or matching information other than the encrypted part of the translation request with information of at least one translator clients, getting matching results, and determining candidate translator clients when said translation request is partially encrypted; and the information of said at least one translator client includes at least one of language, translation time, user rating, translator level and area of expertise.

14. The translation method according to claim 11, wherein said step of determining a target translator client and sending said translation request to said target translator client, further includes the following sub-steps of: determining a target translator client and sending said translation request to said target translator client; or, determining a target translator client according to the scramble speed and comprehensive rating of said at least one translator client and sending said translation request to said target translator client.

15. The translation method according to claim 11, wherein generating said translation request by contents to be translated, and acquiring said contents to be translated by said user client according to the text entered by said user; or acquiring said contents to be translated by said user client by speech recognition technology; or acquiring said contents to be translated by said user client according to the pictures acquired by photography; or acquiring said contents to be translated by said user client by optical character recognition (OCR) technology.

16. The translation method according to claim 11, wherein said translation order includes one or more of contents to be translated, target language, translation price, time requirement, translator level requirement and simultaneous interpretation requirement.

17. The translation method according to claim 11, further comprising the following steps of feeding back information of at least one target translator client to said user client so that said user client feeds back information of said at least one translator client to said server after receiving the information of said target translator client; sending said translation request to said at least one translator client after receiving the information of said at least one translator client.

18. The translation method according to any of claim 11, further comprising the following steps of: receiving the translation results from said at least one translator client; and forwarding said translation results to said user client.

* * * * *